3,429,907
AMINE CYANOFERRATES AND METHODS FOR PREPARING SAME
Grace Peters Papp, Stamford, Conn., and James Wellington Clapp, Princeton, N.J., assignors to American Cyanamid Company, Stamford, Conn., a corporation of Maine
No Drawing. Filed Oct. 23, 1965, Ser. No. 504,181
Int. Cl. A01n 23/00; C07f 15/02
U.S. Cl. 260—439    16 Claims

ABSTRACT OF THE DISCLOSURE

There is provided amine cyanoferrates of the formula:

$$(R\text{—}NH_2)_m \cdot H_m Fe(CN)_6$$

or $$(R'\text{—}X\text{—}R''\text{—}NH_2)_m \cdot H_m Fe(CN)_6$$

where R is an acyclic alkyl radical, R' is an acyclic alkyl radical or an acyclic alkoxyalkoxyalkyl radical, R'' is an acyclic alkylene bridge, X is oxygen or sulfur and $m$ is an integer from 3 to 4. The compounds have particular utility as algicides.

---

The present invention relates to novel amine cyanoferrates and to methods for preparing the same. More particularly, it relates to novel amine cyanoferrates of the formula:

$$(R\text{—}NH_2)_m \cdot H_m Fe(CN)_6$$

or $$(R'\text{—}X\text{—}R''\text{—}NH_2)_m \cdot H_m Fe(CN)_6$$

wherein R is an alkyl substituent containing from 6 to 18 carbon atoms; R' represents an alkyl substituent containing from 4 to 14 carbon atoms or an alkoxyalkoxyalkyl substituent containing from 6 to 16 carbon atoms; X is either oxygen or sulfur; R'' is an alkylene bridge containing from 2 to 4 carbon atoms; and $m$ represents the integer 3 or 4.

The amine cyanoferrates hereinabove defined find utility as antioxidants, lube oil additives and possess nematocidal and algicidal activity as well. Advantageously, each of the novel amine cyanoferrates can be prepared by reacting an appropriate amine with either a ferricyanic acid or ferrocyanic acid.

In general, the compounds of the present invention can be readily prepared by reacting (I) an appropriate amine, such as (a) an alkyl amine as for instance, hexylamine, octylamine, dodecylamine or octadecylamine, (b) an alkyloxyalkylamine, such as 3-decyloxypropylamine, (c) an alkylthioalkylamine, such as 3-(dodecylthio)propylamine or (d) an alkoxyalkoxyalkoxyalkylamine, such as 3-(ethoxyethoxyethoxy)ethylamine or 3-(methoxypropoxypropoxy)ethylamine with (II) either ferrocyanic acid or ferricyanic acid. In the event ferrocyanic acid is employed, approximately 4 mole proportions of the appropriate amine are reacted with 1 mole proportion of the corresponding acid. If ferricyanic acid is employed, approximately 3 mole proportions of the appropriate amine are reacted with 1 mole proportion of the ferricyanic acid. In one embodiment, the reaction takes place in an alcoholic medium. The latter illustratively includes methanol, ethanol and propanol. Thereafter, the desired product precipitates and is recovered, for instance, by filtration.

In a preferred embodiment, a water soluble amine salt, such as the hydrochloride or acetate salt of the appropriate amine, can alternatively be reacted in an aqueous medium with a water-soluble ferrocyanide or water-soluble ferricyanide, such as, for instance, potassium ferrocyanide, sodium ferricyanide or ammonium ferrocyanide. A further alternative involves the reaction between an appropriate amine per se and an acidified aqueous solution of an alkali metal salt, such as sodium ferrocyanide or potassium ferricyanide, wherein the latter reactant is formed in situ as an acid.

Illustrative of the novel compounds which can be formed by the process of the invention hereinabove described include the following:

Hexylamine ferrocyanide,
Hexylamine ferricyanide,
Octylamine ferrocyanide,
Octylamine ferricyanide,
Decylamine ferrocyanide,
Decylamine ferricyanide,
Dodecylamine ferrocyanide,
Dodecylamine ferricyanide,
Tetradecylamine ferrocyanide,
Tetradecylamine ferricyanide,
Hexadecylamine ferrocyanide,
Hexadecylamine ferricyanide,
Octadecylamine ferrocyanide,
Octadecylamine ferricyanide,
1-methylundecylamine ferrocyanide,
1-methylundecylamine ferricyanide,
1-methyldodecylamine ferrocyanide,
1-methyldodecylamine ferricyanide,
1-methyltridecylamine ferrocyanide,
1-methyltridecylamine ferricyanide,
2-ethyldecylamine ferrocyanide,
2-ethyldecylamine ferricyanide,
3-butylhexylamine ferrocyanide,
3-butylhexylamine ferricyanide,
2-propyloctylamine ferrocyanide,
2-propyloctylamine ferricyanide,
3-methyldecylamine ferrocyanide,
3-methyldecylamine ferricyanide,
4-butyltetradecylamine ferrocyanide,
4-butyltetradecylamine ferricyanide,
3-(octyloxy)propylamine ferrocyanide,
3-(octyloxy)propylamine ferricyanide,
3-(decyloxy)propylamine ferrocyanide,
3-(decyloxy)propylamine ferricyanide,
3-(octylthio)propylamine ferrocyanide,
3-(octylthio)propylamine ferricyanide,
3-(dodecylthio)propylamine ferrocyanide,
3-(dodecylthio)propylamine ferricyanide,
Cocoamine ferrocyanide; and
3-(ethoxyethoxyethoxy)propylamine ferrocyanide.

To facilitate a further understanding of the invention, the following examples are presented primarily for purposes of illustrating certain more specific details thereof. The examples are not to be taken as limitative of the invention. Unless otherwise specified, all parts are by weight and the analyses are in percent.

EXAMPLE 1

Preparation of dodecylamine ferrocyanide

A solution of 18.5 grams (0.10 mole) of dodecylamine in water containing a slight excess of hydrochloric acid is diluted to 75 milliliters and added with stirring to a solution of 12.1 grams (0.025 mole) of sodium ferrocyanide decahydrate in 39 milliliters of water. The mixture is diluted to about 400 milliliters with water, and the cream-colored precipitate is filtered, washed thoroughly with water, ethanol and ether, respectively, and then dried in vacuo. A yield of 23.4 grams of desired product having an indefinite melting point between 270° C. and 320° C. is obtained.

Upon analysis in percent, the following data is noted.—
Calc'd for $C_{54}H_{112}FeN_{10}$: C, 67.74; H, 11.79; N, 14.63; Fe, 5.83. Found: C, 67.14; H, 11.78; N, 14.37; Fe, 5.67.

EXAMPLE 2

Preparation of tetradecylamine ferrocyanide

A solution of 2.16 grams (0.010 mole) of ferrocyanic acid (prepared by precipitation with hydrochloric acid from an aqueous solution of potassium ferrocyanide trihydrate and subsequent filtration) in 100 milliliters of ethanol is added with stirring to a solution of 8.54 grams (0.040 mole) of tetradecylamine in 300 milliliters of ethanol. The solid precipitate is filtered, washed with ethanol, and dried in vacuo. A yield of 8.46 grams of a light green solid whose melting point is indefinite is obtained with color changes above 150° C. analyzing in percent as follows.—Calc'd for $C_{62}H_{128}FeN_{10}$: C, 69.62; H, 12.06; N, 13.10; Fe, 5.22. Found: C, 69.44; H, 12.19; N, 13.10; Fe, 5.41.

EXAMPLE 3

Preparation of decylamine ferrocyanide

A solution of 4.84 grams (0.010 mole) of sodium ferrocyanide decahydrate in 50 milliliters of water is added with stirring to a solution of 8.69 grams (0.040 mole) of decylamine acetate in 200 milliliters of water. The precipitate is filtered, washed thoroughly with water and ethanol, and dried in vacuo. There is obtained a yield of 7.70 grams of a cream-colored solid that turns yellowish on exposure to air and whose melting point is indefinite, with color changes above 150° C., analyzing (in percent) as follows.—Calc'd for $C_{46}H_{96}FeN_{10}$: C, 65.37; H, 11.45; N, 16.57; Fe, 6.61. Found: C, 64.83; H, 11.34; N, 16.42; Fe, 6.72.

EXAMPLE 4

Preparation of 1-methyldodecylamine ferrocyanide

A solution of 6.1 grams (0.013 mole) of sodium ferrocyanide decahydrate in 200 milliliters of water is added gradually with stirring to a solution of 13.0 grams (0.05 mole) of 1-methyldodecylamine acetate, prepared from 1-methyldodecylamine and acetic acid in ether, in 200 milliliters of water. The resulting precipitate is filtered, washed thoroughly with water, dried, then washed with ether, and redried. The yield of desired product is 11.5 grams and possesses an indefinite melting point, with color changes above about 140° C.

Upon analysis (in percent) the following is noted.—Calc'd for $C_{58}H_{120}FeN_{10}$: C, 68.73; H, 11.94; N, 13.82; Fe, 5.51. Found: C, 68.72; H, 11.97; N, 13.53; Fe, 5.59.

EXAMPLE 5

Preparation of octylamine ferrocyanide

A solution of 2.6 grams (0.02 mole) of octylamine in 200 milliliters of ethanol is added to a solution of 1.1 grams (0.005 mole) of ferrocyanic acid in 50 milliliters of ethanol. The resulting precipitate is filtered, washed with ethanol, and dried in vacuo. Yield 2.0 grams (55% of theory); melting point is indefinite, with color changes above about 190° C. The product is indicated by analysis to contain ⅔ molecule of ethanol of crystallization per molecule of ferrocyanide salt.

Upon analysis (in percent) the following is noted.—Calc'd for $C_{38}H_{80}FeN_{10} \cdot 2/3C_2H_5OH$: C, 61.86; H, 11.09; N, 18.34; Fe, 7.31. Found: C, 61.53; H, 10.65; N, 18.46; Fe, 7.83.

EXAMPLE 6

Preparation of decylamine ferricyanide

A solution of 4.8 grams (0.015 mole) of potassium ferricyanide in 50 milliliters of water is added slowly with stirring to a solution of 10.0 grams (0.046 mole) of decylamine acetate in 75 milliliters of water. The resulting sticky yellow precipitate is filtered, washed with water, and redissolved in ethanol. The ethanol solution is filtered and the filtrate is diluted with ether. The reddish waxy precipitate is filtered, and again dissolved in ethanol and precipitated with ether. The final precipitate is filtered and dried. A yield of 3.9 grams of desired product whose melting point is indefinite is obtained.

Upon analysis, there is noted the following in percent.—Calc'd for $C_{36}H_{72}FeN_9$: C, 62.95; H, 10.57; N, 18.36; Fe, 8.13. Found: C, 62.53; H, 10.60; N, 18.49; Fe, 8.35.

EXAMPLE 7

Preparation of dodecylamine ferricyanide

A solution of 1.1 grams (0.003 mole) of potassium ferricyanide in 5 milliliters of water is added slowly with stirring to a solution of 2.5 grams (0.01 mole) of dodecylamine acetate in 15 milliliters of water. The resulting yellow precipitate is filtered, washed with water, dissolved in ethanol, and the solution filtered and diluted with ether. The yellow solid is filtered, washed with ether and dried to recover 2.4 grams of desired product having an indefinite melting point with color changes above 85° C.

On analysis (in percent), there is noted the following.—Calc'd for $C_{42}H_{84}FeN_9$: C, 65.42; H, 10.98; N, 16.35; Fe, 7.24. Found: C, 65.33; H, 10.93; N, 16.37; Fe, 7.39.

EXAMPLE 8

Preparation of hexadecylamine ferrocyanide

A solution of 7.2 grams (0.03 mole) of hexadecylamine in 150 milliliters of ethanol is added to a solution of 1.6 grams (0.075 mole) of ferrocyanic acid in 15 milliliters of ethanol. The resulting precipitate is filtered, washed with ethanol, then with ether, and dried in vacuo. A yield of 8.2 grams having an indefinite melting point with color changes above about 150° C. is noted.

Analysis (in percent) is as follows.—Calc'd for $C_{72}H_{144}FeN_{10}$: C, 71.91; H, 12.04; N, 11.62; Fe, 4.63. Found: C, 71.97; H, 12.17; N, .70; Fe, 4.50.

EXAMPLE 9

Preparation of hexadecylamine ferricyanide

A saturated solution of hexadecylamine in ethanol is added slowly to a solution of ferricyanic acid in ethanol in an amount slightly beyond the point where a precipitate ceases to form. The precipitate is filtered, washed with ethanol, and dried. The melting point of the desired product is indefinite, with color changes from about 150° C. and analyzing in percent as follows.—Calc'd for $C_{54}H_{108}FeN_9$: C, 69.04; H, 11.59; N, 13.42; Fe, 5.95. Found: C, 69.35; H, 11.83; N, 12.58; Fe, 5.87.

EXAMPLE 10

Preparation of 3-(octyloxy)propylamine ferrocyanide

A mixture of 7.5 grams (0.04 mole) of 3-(octyloxy)propylamine and 2.4 grams (0.04 mole) of acetic acid is dissolved in 200 milliliters of warm water. A solution of 4.8 grams (0.01 mole) of sodium ferrocyanide decahydrate in 50 milliliters of water is added with stirring. The resulting precipitate is filtered, washed with water, then with ethanol, and dried in vacuo. It is triturated with methylene chloride and redried. A yield of 7.8 grams of desired product whose melting point is 170° C.–180° C. wtih decomposition is obtained and analyzes in percent as follows.—Calc'd for $C_{50}H_{104}FeO_4N_{10}$: C, 62.21; H, 10.86; N, 14.51; Fe, 5.79. Found: C, 62.04; H, 10.70; N, 14.26; Fe, 6.11.

EXAMPLE 11

Preparation of cocoamine ferrocyanide

A solution of 99.3 grams (about 0.5 mole) of cocoamine ("Armeen CD," a commercial product from Armour Industrial Chemical Co., and reported to contain approximately 8% octylamine, 9% decylamine, 47% dodecylamine, 18% tetradecylamine, 8% hexadecylamine, 5% octadecylamine and 5% octadecenylamine) in a mixture of 500 milliliters of water and 33.5 grams of glacial acetic acid is stirred during addition of a solution of 66.8 grams of sodium ferrocyanide decahydrate in 230 milliliters of water. Another 100 milliliters of water is added at the end to improve stirability. The mixture is stirred several minutes more, then filtered. The light-colored solid product is washed well with water, then with methanol, and air-dried. A yield of 124 grams is obtained.

EXAMPLE 12

Preparation of octadecylamine ferrocyanide

A solution of 6.0 grams (0.018 mole) of octadecylamine acetate in a mixture of 620 milliliters of water, 2 milliliters of acetic acid, and 150 milliliters of ethanol is prepared with gentle warming. A solution of 2.17 grams (0.0045 mole) of sodium ferrocyanide decahydrate in 10 milliliters of water is added gradually with stirring. The mixture is stirred 10 minutes more, and the greenish solid is filtered, washed with water and with methanol and air-dried. As desired product, there is obtained a yield of 3.5 grams whose melting point is indefinite and upon analysis (in percent), there is noted the following.—Calc'd for $C_{78}H_{160}FeN_{10}$: C, 72.40; H, 12.46; N, 10.82; Fe, 4.31. Found: C, 72.62; H, 12.30; N, 10.89; Fe, 4.18.

EXAMPLE 13

Preparation of 3-(decyloxy)propylamine ferrocyanide

A mixture of 5.0 grams (0.023 mole) of 3-(decyloxy)-propylamine and 3.0 grams (0.050 mole) of glacial acetic acid in ether is evaporated to dryness. The resultant solid amine acetate is dissolved in 50 milliliters of water, and treated gradually with stirring with a solution of 2.75 grams (0.0057 mole) of sodium ferrocyanide decahydrate in about 20 milliliters of water. The mixture is stirred 5 minutes more and the off-white solid precipitate is filtered off and washed well with water, then with methylene chloride. It is dried in vacuo. Yield of desired product is 4.9 grams and analyzes (in percent) as follows.—Calc'd for $C_{58}H_{120}N_{10}O_4Fe$: C, 64.65; H, 11.23; N, 13.00; Fe, 5.18. Found: C, 64.49; H, 11.26; N, 12.87; Fe, 5.35.

EXAMPLE 14

Preparation of 3-(dodecylthio)propylamine ferrocyanide

A solution of sodium ferrocyanide decahydrate (1.88 grams, 0.0039 mole) in about 10 milliliters of water is added gradually with stirring to a solution of 5.00 grams (0.0156 mole) of 3-(dodecylthio)propylamine acetate in 50 milliliters of water. The mixture is stirred for an additional 10 minutes and the light-colored solid precipitate is filtered off, washed thoroughly with water, then with acetone, and dried. A 3.7 gram yield of desired product whose melting point is indefinite is obtained.

On analysis (in percent), the following is noted.—Calc'd for $C_{66}H_{136}FeN_{10}S_4$: C, 63.21; H, 10.93; N, 11.17; S, 10.22; Fe, 4.45. Found: C, 63.05; H, 10.95; N, 10.89; S, 10.83; Fe, 4.79.

In the example above, the 3-(dodecylthio)propylamine is readily prepared from a reduction of 3-(dodecylthio)propionitrile by means of lithium aluminum hydride and followed by conversion to the acetate salt by treatment in ether solution with glacial acetic acid.

EXAMPLE 15

Preparation of 3-(dodecylthio)propylamine ferricyanide

A solution of 2.48 grams (0.0076 mole) of potassium ferricyanide in 6 milliliters of water is added gradually with stirring to a solution of 7.2 grams (0.0023 mole) of 3-(dodecylthio)propylamine acetate in 50 milliliters of water. Stirring is continued for an additional 10 minutes and the precipitate is filtered and washed sparingly with water. Trituration with acetone converts the product to a yellow solid, which is again filtered and washed on the funnel with acetone. Air-drying provides 6.1 grams of solid (82% of theory).

Analysis (in percent) is as follows.—Calc'd for $C_{51}H_{102}N_9S_3Fe$

C, 61.65; H, 10.34; N, 12.69; S, 9.68; Fe, 5.62. Found: C, 61.90; H, 10.45; N, 12.51; S, 9.47; Fe, 5.68.

EXAMPLE 16

Preparation of 3-(ethoxyethoxyethoxy)propylamine ferrocyanide 3-(ethoxyethoxyethoxy)propylamine (41.3 grams, 0.22 mole) is added dropwise to a stirred and cooled solution of 10.5 grams (0.049 mole) of ferrocyanic acid in 155 milliliters of ethanol. A white precipitate is formed. The mixture is stirred for an additional 25 minutes, then filtered, and the product washed with additional alcohol and is air-dried. A yield of 37.1 grams of desired product is obtained.

Upon analysis (in percent), the following is noted.—Calc'd for $C_{42}H_{88}N_{10}FeO_{12}$: C, 51.42; H, 9.04; N, 14.28; Fe, 5.69. Found: C, 51.22; H, 9.03; N, 14.57; Fe, 5.93.

EXAMPLE 17

To demonstrate the algicidal activity of the compounds of the instant invention, samples of mixed cultures of unicellular, multicellular and filamentous green algae obtained from a fish tank and filamentous type blue-green algae isolated from a paper mill settling pond and tentatively designated as "black algae" are selected for treatment with 1, 5 or 10 p.p.m. of the compounds of the instant invention.

Appropriate dilutions of test compounds made in Chou's media for culture of algae are prepared. Ten milliliter portions of each solution are placed in test tubes and two drops of a stock culture of algae are added to each tube as an inoculum. The inoculated tubes are incubated in a light culture room with about 2000-foot candles light intensity at a temperature of about 78° and a relative humidity of 60%. Incubation is continued for 7 days, then all tubes are examined for algae proliferation.

The tubes in which no growth of algae is observed are rated minus (—) and those in which growth of algae did occur are rated plus (+). From the results of Table I below, it can be noted that the control sample which contains no algicide permits growth of both green and black algae.

It can also be noted that alkylamine ferrocyanide containing less than six carbon atoms in the alkyl group permits growth of the algae in all test cultures. Alkylamine ferricyanides and ferrocyanides of the invention which contain more than six carbon atoms in the alkyl group are found to be effective in controlling algae.

TABLE I

| Compound | Black algae, p.p.m. | | | Mixed culture from fish tank, p.p.m. | |
|---|---|---|---|---|---|
| | 10 | 5 | 1 | 10 | 5 |
| $(n\text{-}C_{12}H_{25}\text{---}NH_2)_4\cdot H_4Fe(CN)_6$ | — | — | — | — | — |
| $(n\text{-}C_{12}H_{25}\text{---}NH_2)_4\cdot H_4Fe(CN)_6$ | — | — | + | — | — |
| $(n\text{-}C_{12}H_{25}\text{---}NH_2)_3\cdot H_3Fe(CN)_6$ | — | — | — | — | — |
| $(n\text{-}C_{16}H_{33}\text{---}NH_2)_3\cdot H_3Fe(CN)_6$ | — | — | — | — | + |
| $(n\text{-}C_{16}H_{33}\text{---}NH_2)_4\cdot H_4Fe(CN)_6$ | — | + | + | — | + |
| $(n\text{-}C_{14}H_{29}\text{---}NH_2)_4\cdot H_4Fe(CN)_6$ | — | — | — | — | + |
| $(n\text{-}C_{10}H_{21}\text{---}NH_2)_4\cdot H_4Fe(CN)_6$ | — | — | + | — | — |
| $(CH_3\text{---}NH_2)_4\cdot H_4Fe(CN)_6$ | + | + | + | + | + |
| $(n\text{-}C_8H_{17}\text{---}O\text{---}(CH_2)_3\text{---}NH_2)_4\cdot H_4Fe(CN)_6$ | + | + | + | + | + |
| $(n\text{-}C_{11}H_{23}\text{---}\underset{\underset{CH_3}{\mid}}{CH}\text{---}NH_2)_4\cdot H_4Fe(CN)_6$ | — | — | + | — | — |

+ means growth. — means no growth.

We claim:
1. A compound of the formula:

$$(R\text{---}NH_2)_m \cdot H_mFe(CN)_6$$

or $$(R'\text{---}X\text{---}R''\text{---}NH_2)_m \cdot H_mFe(CN)_6$$

wherein R is an acyclic alkyl substituent containing from 6 to 18 carbon atoms; R' represents a member selected from the group consisting of an acyclic alkyl substituent containing from 4 to 14 carbon atoms and an acyclic alkoxyalkoxyalkyl group containing from 6 to 16 carbon atoms; X is either oxygen or sulfur; R″ is an acyclic alkylene bridge containing from 2 to 4 carbon atoms; and *m* represents the integer 3 or 4.

2. The compound: dodecylamine ferrocyanide.
3. The compound: tetradecylamine ferrocyanide.
4. The compound: decylamine ferrocyanide.
5. The compound: 1-methyldodecylamine ferrocyanide.
6. The compound: octylamine ferrocyanide.
7. The compound: decylamine ferricyanide.
8. The compound: dodecylamine ferricyanide.
9. The compound: hexadecylamine ferrocyanide.
10. The compound: hexadecylamine ferricyanide.
11. The compound: 3-(octyloxy)propylamine ferrocyanide.
12. The compound: cocoamine ferrocyanide.
13. The compound: octadecylamine ferrocyanide.
14. The compound: 3-(decyloxy)propylamine ferrocyanide.
15. The compound: 3-(dodecylthio)propylamine ferrocyanide.
16. The compound: 3-(dodecylthio)propylamine ferricyanide.

References Cited

Sidgwick, Chemical Elements and Their Compounds, vol. II, Oxford University Press, London, 1950, p. 1336.
Briggs, J. Chem. Soc. 99 (1911), p. 1029.
Cumming, J. Chem. Soc. 123 (1923), pp. 2460–1.
Cumming, J. Chem. Soc. 121 (1922), pp. 1287–1291.

HELEN M. McCARTHY, *Primary Examiner.*

A. P. DEMERS, *Assistant Examiner.*

U.S. Cl. X.R.

210—64; 252—49.7, 397, 400, 401; 260—999; 71—67